US012048602B2

(12) United States Patent
Zhao et al.

(10) Patent No.: US 12,048,602 B2
(45) Date of Patent: Jul. 30, 2024

(54) ELECTRIC TOOTHBRUSH COMPRISING THREE-SIDED BRISTLES

(71) Applicant: Shanghai Heisr Intelligent Technology Co., Ltd., Shanghai (CN)

(72) Inventors: Mao Zhao, Shanghai (CN); Yaoqing Zhu, Shanghai (CN); Jian Zhang, Shanghai (CN)

(73) Assignee: SHANGHAI HEISR INTELLIGENT TECHNOLOGY CO. LTD., Shanghai (CN)

( * ) Notice: Subject to any disclaimer, the term of this patent is extended or adjusted under 35 U.S.C. 154(b) by 473 days.

(21) Appl. No.: 17/403,817

(22) Filed: Aug. 16, 2021

(65) Prior Publication Data

US 2021/0369432 A1 Dec. 2, 2021

Related U.S. Application Data

(63) Continuation-in-part of application No. PCT/CN2020/076450, filed on Feb. 24, 2020.

(30) Foreign Application Priority Data

Mar. 11, 2019 (CN) .......................... 201910183180.4

(51) Int. Cl.
*A61C 17/34* (2006.01)
*A46B 9/04* (2006.01)

(52) U.S. Cl.
CPC ............ *A61C 17/349* (2013.01); *A46B 9/045* (2013.01); *A61C 17/3472* (2013.01)

(58) Field of Classification Search
CPC .... A46B 9/045; A61C 17/349; A61C 17/3472
See application file for complete search history.

(56) References Cited

U.S. PATENT DOCUMENTS

| 5,850,655 | A | 12/1998 | Goecking et al. |
| 2012/0005848 | A1 | 1/2012 | Zeng |
| 2017/0239028 | A1 | 8/2017 | Baek |

FOREIGN PATENT DOCUMENTS

| CN | 201164508 Y | 12/2008 |
| CN | 101513364 A | 8/2009 |
| CN | 101513364 B | 6/2012 |
| CN | 202476818 U | 10/2012 |
| CN | 207168136 U | 4/2018 |
| CN | 109043800 A | 12/2018 |
| CN | 109793589 A | 5/2019 |
| CN | 111202604 A | 5/2020 |
| CN | 111772329 A | 10/2020 |

(Continued)

*Primary Examiner* — Randall E Chin
(74) *Attorney, Agent, or Firm* — MATTHIAS SCHOLL P.C.; Matthias Scholl

(57) ABSTRACT

An electric toothbrush includes a toothbrush body. The toothbrush body includes a toothbrush head. The toothbrush head includes a handle part, a first platy body disposed below the handle part, and a first brushing sheet and a second brushing sheet disposed side by side and below the first platy body. The lower surface of the first platy body is provided with a first brush bristle, the rear side surface of the first brushing sheet is provided with a second brush bristle, and the front side surface of the second brushing sheet is provided with a third brush bristle.

9 Claims, 6 Drawing Sheets

(56) References Cited

FOREIGN PATENT DOCUMENTS

| | | | |
|---|---|---|---|
| CN | 109793589 B | | 1/2021 |
| CN | 109793586 B | | 3/2021 |
| CN | 109793587 B | | 3/2021 |
| CN | 109793588 B | | 3/2021 |
| CN | 109864830 B | | 3/2021 |
| CN | 111759515 B | | 2/2022 |
| DE | 78410 C | | 11/1894 |
| DE | 4412379 A1 | | 10/1995 |
| DE | 20317780 U1 | | 2/2004 |
| EP | 0173114 A2 | * | 3/1986 |
| EP | 0312462 A1 | | 4/1989 |
| JP | S60160727 U | | 10/1985 |
| JP | 2005185410 A | | 7/2005 |
| KR | 20060086318 A | * | 7/2006 |
| KR | 101630739 B1 | | 6/2016 |
| TW | 200302071 A | | 8/2003 |

* cited by examiner

ELECTRIC TOOTHBRUSH COMPRISING THREE-SIDED BRISTLES

CROSS-REFERENCE TO RELAYED APPLICATIONS

This application is a continuation-in-part of International Patent Application No. PCT/CN2020/076450 with an international filing date of Feb. 24, 2020, designating the United States, now pending, and further claims foreign priority benefits to Chinese Patent Application No. 201910183180.4 filed Mar. 11, 2019. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, MA 02142.

BACKGROUND

The disclosure relates to the mechanical field, and more particularly to an electric toothbrush.

The toothbrush head of a conventional electric toothbrush has only one-sided brush bristles. As the upper and lower rows of the teeth are rough, the blind area in the upper and inner sides of the teeth are difficult to clean. In addition, when brushing the teeth, it is necessary to change the directions of the toothbrush head for many times to clean the outer sides and the inner sides of the teeth and the surfaces of the molar teeth, which is time-consuming and laborious and a bad tooth brushing habit may be developed.

SUMMARY

One objective of the disclosure is to provide an electric toothbrush comprising three-sided brush bristles.

The disclosure provides an electric toothbrush comprising a toothbrush body; the toothbrush body comprises a toothbrush head; the toothbrush head comprises a handle part, a first platy body disposed below the handle part, and a first brushing sheet and a second brushing sheet disposed side by side and below the first platy body; and a lower surface of the first platy body is provided with a first brush bristle, a rear side surface of the first brushing sheet is provided with a second brush bristle, and a front side surface of the second brushing sheet is provided with a third brush bristle.

In a class of this embodiment, the handle part comprises a first through hole, and a first pressing nail disposed through the first through hole; with the first pressing nail as a first rotating shaft, the first platy body comprises a first mounting hole for receiving the first rotating shaft;

a second platy body is disposed below the first platy body; a front side of the first platy body is provided with a sliding plate; a back portion of the sliding plate extends into a space between the first platy body and the second platy body, and two side portions of the first platy body are provided with sliding grooves, respectively; a back portion of the sliding plate is provided with two sliding blocks matched with the sliding grooves, respectively; an upper portion of each of the sliding blocks extends out from upper sides of the sliding grooves; two bulky bodies are disposed above the first platy body, and each of the two bulky bodies comprises a first embedding groove for receiving the upper portion of each sliding block; a stop dog for pushing the two bulky bodies is disposed below the handle part, and the stop dog is disposed on a rear side of the first through hole;

a lining plate is disposed below the sliding plate; the lining plate comprises a second mounting hole, and a connecting rod is disposed through the second mounting hole; a brushing sheet bracket is disposed below the lining plate; with the connecting rod as a second rotating shaft, the brushing sheet bracket comprises a third mounting hole for receiving the second rotating shaft, and the first brushing sheet is disposed below the brushing sheet bracket;

a steering member is disposed above the sliding plate; the steering member comprises a first insert hole for receiving an upper portion of the connecting rod; a back portion of the steering member is provided with a groove, and a side portion of the handle part close to the groove is provided with a protrusion for pushing the steering member to deflect;

the second platy body comprises a fourth mounting hole, and a second pressing nail is disposed through the fourth mounting hole; a second brushing sheet is disposed below the second platy body; with the second pressing nail as a third rotating shaft, the second brushing sheet comprises a fifth mounting hole for receiving the third rotating shaft; and a connecting column is disposed between the first platy body and the second platy body, and a middle portion of the sliding plate is provided with a mounting groove; a spring is disposed in the mounting groove, and one end of the spring is fixed to the sliding plate and the other end of the spring is fixed to the connecting column.

In a class of this embodiment, the lining plate comprises two second mounting holes, and the two second mounting holes are respectively disposed in two side portions of the lining plate; and the second platy body comprises two fourth mounting holes, and the two fourth mounting holes are respectively disposed in two side portions of the second platy body.

The brush bristles on the lower surface of the second platy body are disposed vertically; the brush bristles on the rear side surface of the first brushing sheet are disposed obliquely and the brush bristles on the front side surface of the second brushing sheet are disposed obliquely.

In a class of this embodiment, the first platy body comprises a first cylindrical protrusion; a front portion of the handle part comprises a driving wheel; with the first cylindrical protrusion as a first rotating shaft, a middle portion of the driving wheel comprises a first through hole for receiving the first rotating shaft;

the first platy body is provided with two driven wheels disposed in parallel; the driven wheels are in engaged connection to the driving wheel; a front side of the first platy body is provided with a sliding plate; a steering member is disposed above the sliding plate, and a cam for pushing the steering member to deflect is disposed below the driven wheel;

a second platy body is disposed below the first platy body; a back portion of the sliding plate extends into a space between the first platy body and the second platy body; a connecting column is disposed between the first platy body and the second platy body; a middle portion of the sliding plate is provided with a mounting groove; a spring is disposed in the mounting groove; one end of the spring is fixed to the sliding plate and the other end of the spring is fixed to the connecting column;

a lining plate is disposed below the sliding plate; the lining plate comprises a second cylindrical protrusion, and a first brushing sheet bracket is disposed below the lining plate; with the second cylindrical protrusion as a second rotating shaft, the first brushing sheet bracket comprises a second through hole for receiving the second rotating shaft, and the first brushing sheet is disposed below the first brushing sheet bracket; and a back portion of the second platy body comprises a third cylindrical protrusion; a second brushing sheet bracket is disposed below the second platy body; with the third cylindrical protrusion as a third rotating shaft, the second brushing sheet bracket comprises a third through hole for receiving the third rotating shaft, and the second brushing sheet is disposed below the second brushing sheet bracket.

The driven wheel and the cam are of an integrated structure.

The electric toothbrush comprises two first brushing sheet brackets, and the two first brushing sheet brackets are respectively disposed on two side portions of the lining plate; and the electric toothbrush comprises two second brushing sheet brackets, and the two second brushing sheet brackets are respectively disposed on two side portions of the second platy body.

The brush bristles on the lower surface of the second platy body are disposed vertically, the brush bristles on the rear side surface of the first brushing sheet are disposed obliquely and the brush bristles on the front side surface of the second brushing sheet are disposed obliquely.

In a class of this embodiment, a rear side surface of the first brushing sheet comprises a first embedding groove, and a first tooth contact piece is disposed in the first embedding groove; the first tooth contact piece comprises a first protrusion, and an outer side surface of the first protrusion is cambered; and a front side surface of the second brushing sheet comprises a second embedding groove, and a second tooth contact piece is disposed in the second embedding groove; the second tooth contact piece comprises a second protrusion, and an outer side surface of the second protrusion is cambered.

In a class of this embodiment, a front portion of the handle part comprises a mounting hole; a fixed nail is disposed through the mounting hole; the first platy body is disposed below the handle part; with the fixed nail as a first rotating shaft, a middle portion of the first platy body comprises a first through hole for receiving the first rotating shaft;

the first platy body comprises a first sliding piece and a second sliding piece disposed oppositely to each other; the front portion of the handle part is provided with a cam for pushing the first sliding piece and the second sliding piece, and a spring is disposed between the first sliding piece and the second sliding piece; and a lower portion of the first sliding piece is provided with the first brushing sheet and a lower portion of the second sliding piece is provided with the second brushing sheet.

A cross section of the cam is elliptical.

The electric toothbrush comprises two first brushing sheets, and the two first brushing sheets are respectively disposed on two side portions of the first sliding piece; and the electric toothbrush comprises two second brushing sheets, and the two second brushing sheets are respectively disposed on two side portions of the second sliding piece.

The first brushing sheets are connected to the first sliding piece via the second rotating shaft, and the second brushing sheets are connected to the second sliding piece via the third rotating shaft.

The brush bristles on the lower surface of the first platy body are disposed vertically, the brush bristles on the rear side surface of the first brushing sheet are disposed obliquely and the brush bristles on the front side surface of the second brushing sheet are disposed obliquely.

In a class of this embodiment, a rear side surface of the first brushing sheet comprises a first embedding groove; a first tooth contact piece is disposed in the first embedding groove; the first tooth contact piece comprises a first protrusion, and an outer side surface of the first protrusion is cambered; and a front side surface of the second brushing sheet comprises a second embedding groove, and a second tooth contact piece is disposed in the second embedding groove; the second tooth contact piece comprises a second protrusion, and an outer side surface of the second protrusion is cambered.

In a class of this embodiment, a second platy body is disposed below the handle part; the second platy body comprises a first cylindrical protrusion, and the front portion of the handle part is provided with a first groove for receiving the first cylindrical protrusion;

the second brushing sheet is disposed below a rear portion of the second platy body;

a middle portion of the first platy body comprises a sliding groove for receiving the second platy body; with the first platy body as a sliding piece, the front portion of the handle part comprises a pushing piece for pushing the sliding piece to move forward;

the toothbrush head comprises a reset mechanism which comprises a pull rod; the pull rod is disposed above the handle part; a back portion of the handle part comprises a first protrusion, and a spring is fixed to the back portion of the pull rod; one end of the spring is fixed to the pull rod, and the other end of the spring is fixed to the first protrusion;

a front portion of the pull rod comprises a second cylindrical protrusion; a front side of the pull rod comprises a first connecting sheet; a back portion of the first connecting sheet comprises a first through hole for receiving the second cylindrical protrusion; a front side of the first connecting sheet is provided with a rotating sheet; an upper end portion of the first cylindrical protrusion is fixed to a back portion of the rotating piece, and a middle portion of the rotating sheet is provided with two third cylindrical protrusions disposed in parallel; the front portion of the handle part comprises a second protrusion, and the second protrusion is disposed between the two third cylindrical protrusions; and a front portion of the rotating sheet is provided with a connecting rod; a front portion of the sliding piece is provided with a second through hole; the connecting rod penetrates through the second through hole, and the first brushing sheet is fixed to a lower portion of the connecting rod.

In a class of this embodiment, the front portion of the handle part comprises a second groove; a side wall of the second groove is provided with a fourth cylindrical protrusion and a fifth cylindrical protrusion; a first connecting rod is fixed to the fourth cylindrical protrusion, and a cross section of the first connecting rod is V-shaped; the middle portion of the first connecting rod is provided with a third through hole for receiving the fourth cylindrical protrusion;
a lower portion of the pull rod is provided with a third protrusion for pushing and pulling the first connecting rod, and the third protrusion is disposed above the third through hole;
a front side of the first connecting rod is provided with a second connecting sheet; the first connecting rod is provided with a sixth cylindrical protrusion; a back portion of the second connecting sheet is provided with a fourth through hole for receiving the sixth cylindrical protrusion; a front side of the second connecting sheet is provided with a second connecting rod; a back portion of the second connecting rod is provided with a seventh cylindrical protrusion, and a front portion of the second connecting sheet is provided with a fifth through hole for receiving the seventh cylindrical protrusion;
a middle portion of the second connecting rod is provided with a fourth through hole for receiving the sixth cylindrical protrusion, and the front portion of the second connecting rod is disposed below the pushing piece; and
the front portion of the handle part is provided with a mounting groove; a middle portion of the pushing piece is disposed in the mounting groove, and a depth of the mounting groove is greater than a thickness of the middle portion of the pushing piece.

The following advantages are associated with the electric toothbrush comprising three-sided brush bristles of the disclosure. Owing to the surrounding effect of the three-sided brush bristles and adapting to the thickness change from the frontal teeth to the molar teeth, a self-adaptive effect that the brush bristles automatically attach to the teeth can achieve the purpose of effectively cleaning the teeth of people with different sizes of oral cavities and teeth. The design of the three-sided brush bristles solves the cleaning problem of the blind area on the inner side of the tooth and avoids the development of various bad tooth brushing habits. A user no longer needs to change the position of the toothbrush to search for a cleaning point and only needs to push the toothbrush head to complete the whole tooth brushing process, such that the tooth brushing process is simplified and the tooth brushing efficiency is improved.

DETAILED DESCRIPTION

To further illustrate, embodiments detailing an electric toothbrush with three-sided brush bristles are described below. It should be noted that the following embodiments are intended to describe and not to limit the disclosure.

Example 1

Figure 1:
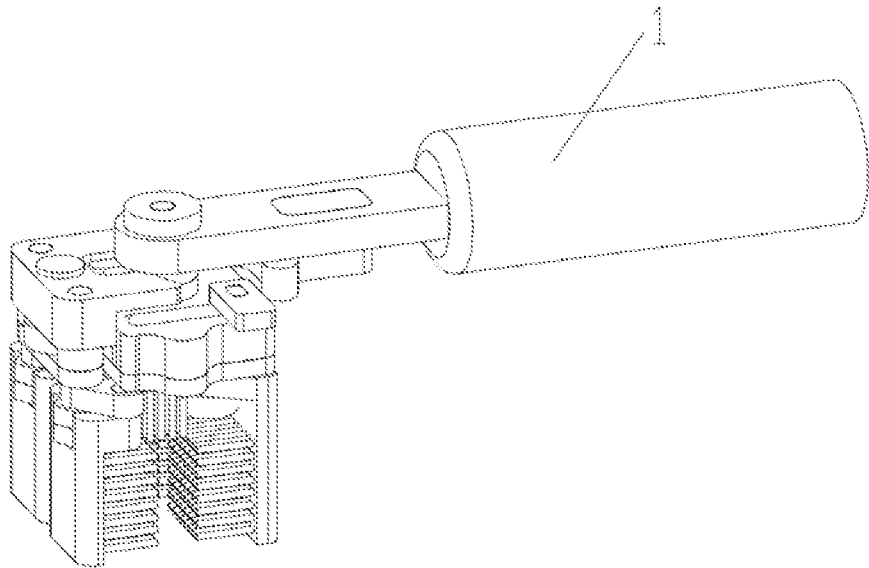
FIG. 1 is a partial structural schematic diagram of an electric toothbrush of Example 1.
Figure 2:
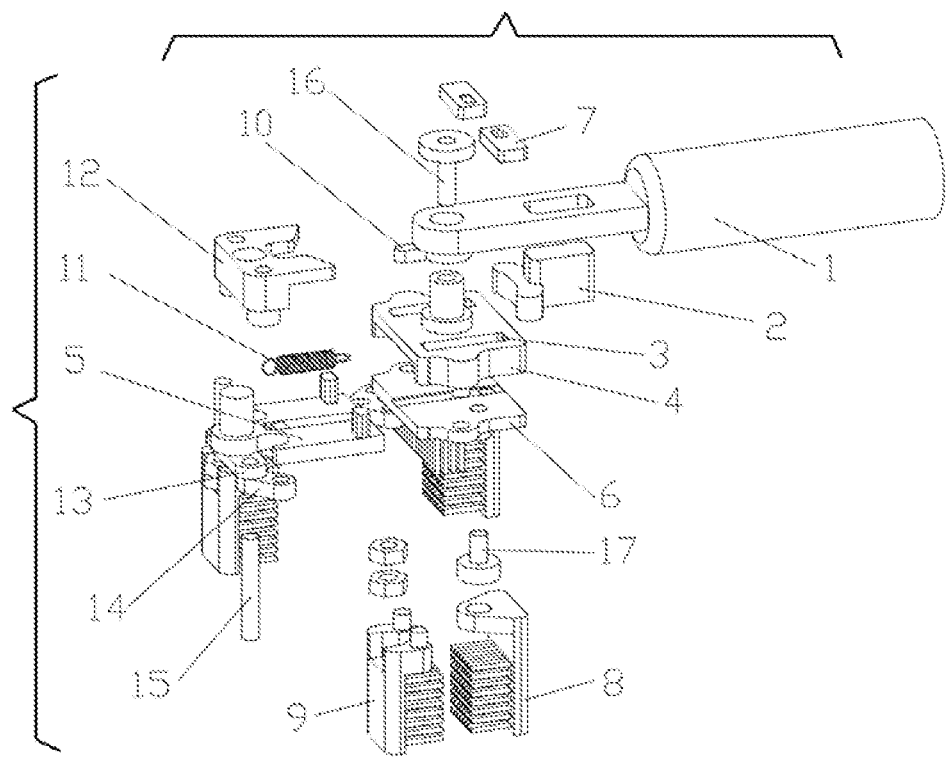
FIG. 2 is an exploded view of a partial structure of the electric toothbrush of Example 1.
Figure 3:
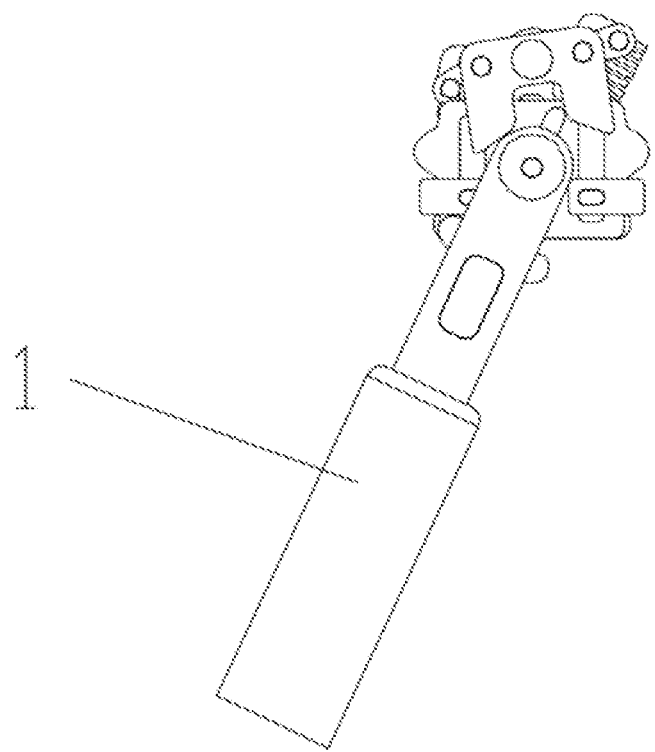
FIG. 3 is a schematic diagram of the electric toothbrush of Example 1 in a use state.

As shown in FIG. 1 to FIG. 3, an electric toothbrush with the three-sided brush bristles comprises a toothbrush body; the toothbrush body comprises a toothbrush head; the toothbrush head comprises a handle part 1 the handle part comprises a first through hole and a first pressing nail 16 disposed through the first through hole; the first pressing nail is taken as a first rotating shaft, and the first platy body 4 is disposed below the first platy body 4; the first platy body comprises a first mounting hole for receiving the first rotating shaft; a second platy body 6 is disposed below the first platy body, and a lower surface of the second platy body is provided with a brush bristle; a front side of the first platy body is provided with a sliding plate 5; a back portion of the sliding plate extends into a space between the first platy body and the second platy body, and two side portions of the first platy body are provided with sliding grooves 3, respectively; a back portion of the sliding plate is provided with two sliding blocks matched with the sliding grooves; an upper portion of each of the sliding blocks extends out from the upper sides of the sliding grooves; two bulky bodies 7 are disposed above the first platy body, and each of the bulky bodies comprises a first embedding groove for receiving the upper portion of each sliding block; a stop dog 2 for pushing the two bulky bodies is disposed below the handle part, and the stop dog is disposed on a rear side of the first through hole; a lining plate 13 is disposed below the sliding plate; the lining plate comprises a second mounting hole, and a connecting rod 15 is disposed through the second mounting hole. The connecting rod is taken as a second rotating shaft, and a brushing sheet bracket 14 is disposed below the lining plate; the brushing sheet bracket comprises a third mounting hole for receiving the second rotating shaft; the first brushing sheet 9 is disposed below the brushing sheet bracket, and a back side surface of the first brushing sheet is provided with the brush bristle; a steering member 12 is disposed above the sliding plate, and the steering member comprises a first insert hole for receiving an upper portion of the connecting rod; a back portion of the steering member is provided with a groove, and a side portion of the handle part close to the groove is provided with a protrusion 10 for pushing the steering member to deflect; the second platy body comprises a fourth mounting hole; a second pressing nail 17 is disposed through the fourth mounting hole; with the second pressing nail as a third rotating shaft, a second brushing sheet 8 is disposed below the second platy body; the second brushing sheet comprises a fifth mounting hole for receiving the third rotating shaft, and a front side surface of the second brushing sheet is provided with the brush bristle; a connecting column is disposed between the first platy body and the second platy body, and a middle portion of the sliding plate is provided with a mounting groove; a spring 11 is disposed in the mounting groove; one end of the spring is fixed to the sliding plate and the other end of the spring is fixed to the connecting column. Owing to the surrounding effect of the three-sided brush bristles and adapting to the thickness change from the frontal teeth to the molar teeth, a self-adaptive effect that the brush bristles automatically attach to the teeth can achieve the purpose of effectively cleaning the teeth of people with different sizes of oral cavities and teeth. The design of the three-sided brush bristles solves the cleaning problem of the blind area on the inner side of the tooth and avoids the development of various bad tooth brushing habits. A user no longer needs to change the position of the toothbrush to search for a cleaning point and only needs to push the toothbrush head to complete the whole tooth brushing process, such that the tooth brushing process is simplified and the tooth brushing efficiency is improved.

The electric toothbrush comprises two second mounting holes, and the two second mounting holes are respectively disposed in two side portions of the lining plate. The electric toothbrush comprises two fourth mounting holes, and the two fourth mounting holes are respectively disposed in two side portions of the second platy body. The electric toothbrush comprises two first brushing sheets and second brushing sheets; the four brushing sheets are rotatable, and different curved surfaces of teeth are laminated according to the design of the split brush bristles effectively, such that teeth gaps are cleaned efficiently.

The cross section of the groove is U-shaped. It is convenient for the protrusion on the front side of the handle part to push the steering member to generate angle deflection; the larger the angle by which the handle part rotates is, the larger the gap between the first brushing sheet and the second brushing sheet is. The effect of being self-adaptive to tooth thickness is improved.

The handle part is provided with the second embedding groove, and the upper portion of the stop dog is disposed in the second embedding groove. A side surface of the stop dog close to the first rotating shaft is a cambered surface. In order to detach the stop dog, one side surface of the stop dog is cambered, thereby improving the bulky body pushing effect, and it is smoother to push the bulky body.

To improve the cleaning effect, the brush bristles on the lower surface of the second platy body are disposed vertically, the brush bristles on the rear side surface of the first brushing sheet are disposed obliquely and the brush bristles on the front side surface of the second brushing sheet are disposed obliquely.

The cross section of each of the brush bristle brackets is V-shaped; the third mounting hole is formed in the middle portion of the brush bristle bracket; two side portions of the brush bristle bracket are provided with second insertion holes; the upper portion of the first brushing sheet is provided with two cylindrical protrusions, and the cylindrical protrusions are inserted into the second insertion holes. The upper portion of the first brushing sheet is provided with a third embedding groove; the third embedding groove is internally provided with a nut; a lower portion of the connecting rod is provided with an external nut, and a lower portion of the connecting rod is screwed into the nut. The first pressing nail comprises a first head and a first straight bar disposed below the first head; the first straight bar penetrates through the first through hole, and a width of the first head is greater than a diameter of the first through hole. The second pressing nail comprises a second head and a second straight bar disposed below the second head; the second straight bar penetrates through the second through hole, and a width of the second head is greater than a diameter of the fourth through hole. In order to ensure a fixing effect, the structural stability of the device is improved.

When teeth are brushed, the front surface of the toothbrush is placed in the oval cavity, and the user pushes the handle part along a tooth-brushing direction; the handle part rotates, and the protrusion disposed on the front side of the handle part pushes the steering member to deflect at angle, such that a certain gap is distracted to fit a corner of a tooth; the handle part rotates continuously; the stop dog mounted on the handle part pushes the bulky body to shift along with rotation; the bulky body drives the sliding plate and the connecting piece to shift together, such that the first brushing sheet and the second brushing sheet expand towards two sides along with thickness change to be self-adaptive to the thickness change from the front tooth to the molar tooth, and then the brush bristle is frapped by the spring to fit the tooth. Further, by matching and exerting the parts, a self-adaptive effect of expanding the toothbrush head, clinging the toothbrush head to the teeth and transforming the angle freely is achieved.

Example 2

Figure 4:
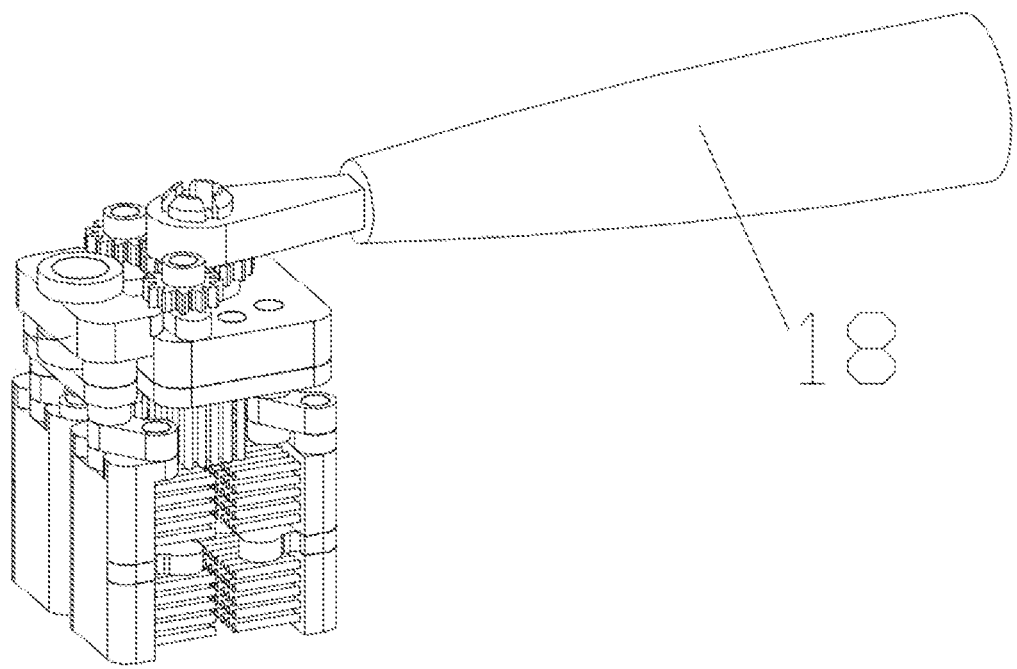
FIG. 4 is a partial structural schematic diagram of an electric toothbrush of Example 2.
Figure 5:
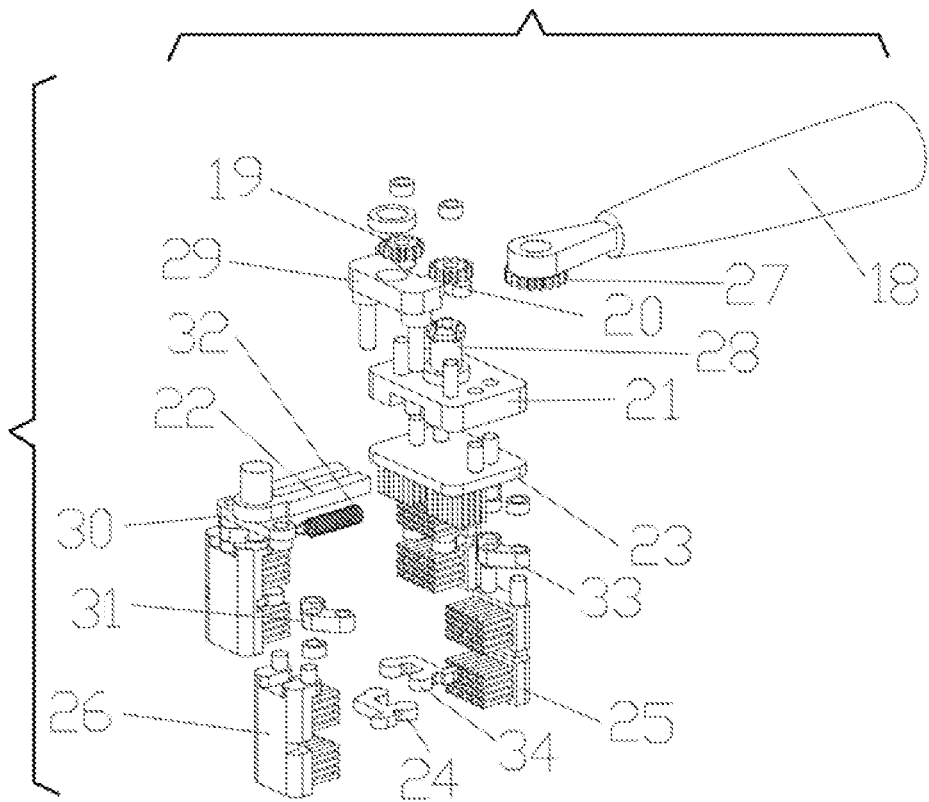
FIG. 5 is an exploded view of a partial structure of the electric toothbrush of the Example 2.

As shown in FIG. 4 to FIG. 5, an electric toothbrush with the three-sided brush bristles comprises a toothbrush body; the toothbrush body comprises a toothbrush head; the toothbrush head comprises a handle part 18; the first platy body 21 is disposed below the handle part; the first platy body comprises a first cylindrical protrusion 28; a front portion of the handle part is provided with the driving wheel 27; the first cylindrical protrusion is taken as the first rotating shaft, and a middle portion of the driving wheel comprises a first through hole for receiving the first rotating shaft; the first platy body is provided with two driven wheels 19 disposed in parallel; the driven wheels are in engaged connection to the driving wheel; the front side of the first platy body is provided with a sliding plate 22; a steering member 29 is disposed above the sliding plate, and the cam 20 for pushing the steering member 29 to deflect is disposed below the driven wheel; the second platy body 23 is disposed below the first platy body; a back portion of the sliding plate extends into a space between the first platy body and the second platy body; a connecting column is disposed between the first platy body and the second platy body; the middle portion of the sliding plate is provided with a mounting groove; a spring 32 is disposed in the mounting groove; one end of the spring is fixed to the sliding plate and the other end of the spring is fixed to the connecting column; a lining plate 30 is disposed below the sliding plate; the lining plate comprises a second cylindrical protrusion, and a first brushing sheet bracket is disposed below the lining plate; the second cylindrical protrusion is taken as the second rotating shaft. The first brushing sheet bracket 31 comprises a second through hole for receiving the second rotating shaft, and the first brushing sheet 26 is disposed below the first brushing sheet bracket; a back portion of the second platy body comprises a third cylindrical protrusion; a second brushing sheet bracket 33 is disposed below the second platy body; the third cylindrical protrusion is taken as the third rotating shaft; the second brushing sheet bracket comprises a third through hole for receiving the third rotating shaft, and the second brushing sheet 25 is disposed below the second brushing sheet bracket; the lower surface of the second platy body is provided with the brush bristle; the rear side surface of the first brushing sheet is provided with the brush bristle, and the front side surface of the second brushing sheet is provided with the brush bristle. Owing to the surrounding effect of the three-sided brush bristles and adapting to the thickness change from the frontal teeth to the molar teeth, a self-adaptive effect that the brush bristles automatically attach to the teeth can achieve the purpose of effectively cleaning the teeth of people with different sizes of oral cavities and teeth. The design of the three-sided brush bristles solves the cleaning problem of the blind area on the inner side of the tooth and avoids the development of various bad tooth brushing habits. A user no longer needs to change the position of the toothbrush to search for a cleaning point and only needs to push the toothbrush head to complete the whole tooth brushing process, such that the tooth brushing process is simplified and the tooth brushing efficiency is improved.

The driven wheel and the cam are of an integrated structure. The driven wheel and the cam are integrally formed by a plastic, such that a transmission effect is guaranteed.

The steering member is a bulky body. A side portion of the steering member close to the driven wheel is provided with a groove. A bottom surface of the groove is cambered. It is ensured that the pushing effect that the cam pushes the steering member smoother.

There are two first brushing sheet brackets, and the two first brushing sheet brackets are respectively disposed on two side portions of the lining plate; and there are two second brushing sheet brackets, and the two second brushing sheet brackets are respectively disposed on two side portions of the second platy body. Thus, there are two first brushing sheets and second brushing sheets; the four brushing sheets are rotatable, and different curved surfaces of teeth are laminated according to the design of the split brush bristles effectively, such that teeth gaps are cleaned efficiently.

To improve the cleaning effect, the brush bristles disposed on the lower surface of the second platy body are disposed vertically, and the brush bristles disposed on the rear side surface of the first brushing sheet are disposed obliquely and the brush bristles disposed on the front side surface of the second brushing sheet are disposed obliquely.

The rear side surface of the first brushing sheet comprises a first embedding groove, and a first tooth contact piece 24 is disposed in the first embedding groove; the first tooth contact piece comprises a first protrusion, and an outer side surface of the first protrusion is cambered; and a front side surface of the second brushing sheet comprises a second embedding groove; a second tooth contact piece 34 is disposed in the second embedding groove; the second tooth contact piece comprises a second protrusion, and an outer side surface of the second protrusion is cambered. Both the first tooth contact piece and the second tooth contact piece are strip-type body. There are two first protrusions and the two first protrusions are disposed on two side portions of the first tooth contact piece; and there are two second protrusions and the two second protrusions are disposed on two side portions of the second tooth contact piece. The first tooth contact piece and the second tooth contact piece in contact with teeth with different thicknesses can push the first brushing sheet and the second brushing sheet to expand towards two sides along with thickness change of the teeth so as to be self-adaptive to the thickness change from the front tooth to the molar tooth. The two first protrusions and two second protrusion fit the surfaces of the teeth during use, such that the brushing sheets fit the surfaces of the teeth better after rotation, and thus, the contact area between the brush bristles and the surfaces of the teeth is larger, and the cleaning effect is improved.

The upper portion of the first cylindrical protrusion is provided with annular protrusion for fixing the handle part. The first platy body is provided with two driven wheel mounting columns; middle portions of the driven wheel and the cam are provided with a fourth through hole for penetrating the driven wheel mounting columns; a second retainer ring for fixing the position of the driven wheel is disposed above the driven wheel, and the second retainer ring is fixed to the upper portion of the driven wheel mounting columns. The cross section of the first brush bristle bracket is V-shaped; the second mounting hole is formed in the middle portion of the brush bristle bracket; two side portions of the first brush bristle bracket are provided with first insertion holes; the upper portion of the first brushing sheet is provided with two cylindrical protrusions, and the cylindrical protrusions are inserted into the second insertion holes; the cross section of the second brush bristle bracket is V-shaped; the third mounting hole is formed in the middle portion of the brush bristle bracket; two side portions of the second brush bristle bracket are provided with second insertion holes; the upper portion of the second brushing sheet is provided with two cylindrical protrusions, and the cylindrical protrusions are inserted into the second insertion holes. In order to ensure a fixing effect, the structural stability of the device is improved.

When the teeth are brushed, the front surface of the toothbrush is placed in the oval cavity, and the user pushes the handle part along a tooth-brushing direction; the handle part rotates, and the driving wheel disposed on the front side of the handle part is in engaged transmission with the driven wheel; the driven wheel drives the cam below to push the steering member to deflect at angle, such that a certain gap is distracted to fit a corner of a tooth; the first tooth contact piece and the second tooth contact piece mounted on the first brushing sheet and the second brushing sheet are in contact with the teeth with different thicknesses so as to further push the first brushing sheet and the second brushing sheet to expand towards two sides along with thickness change to be self-adaptive to the thickness change from the front tooth to the molar tooth, and then the brush bristle is frapped by the spring to fit the tooth. Further, by matching and exerting the parts, a self-adaptive effect of expanding the toothbrush head, clinging the toothbrush head to the teeth and transforming the angle freely is achieved.

Example 3

Figure 6:
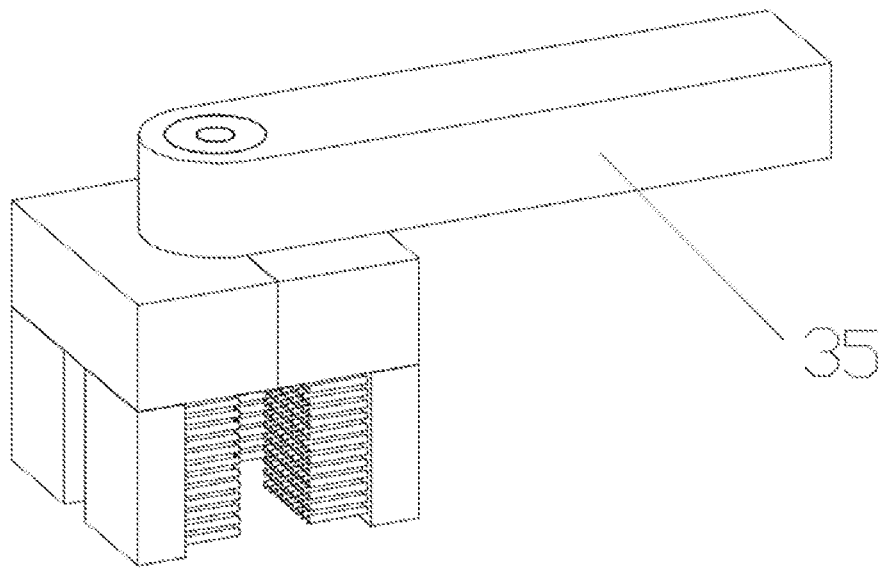
FIG. 6 is a partial structural schematic diagram of the electric toothbrush of Example 3.
Figure 7:
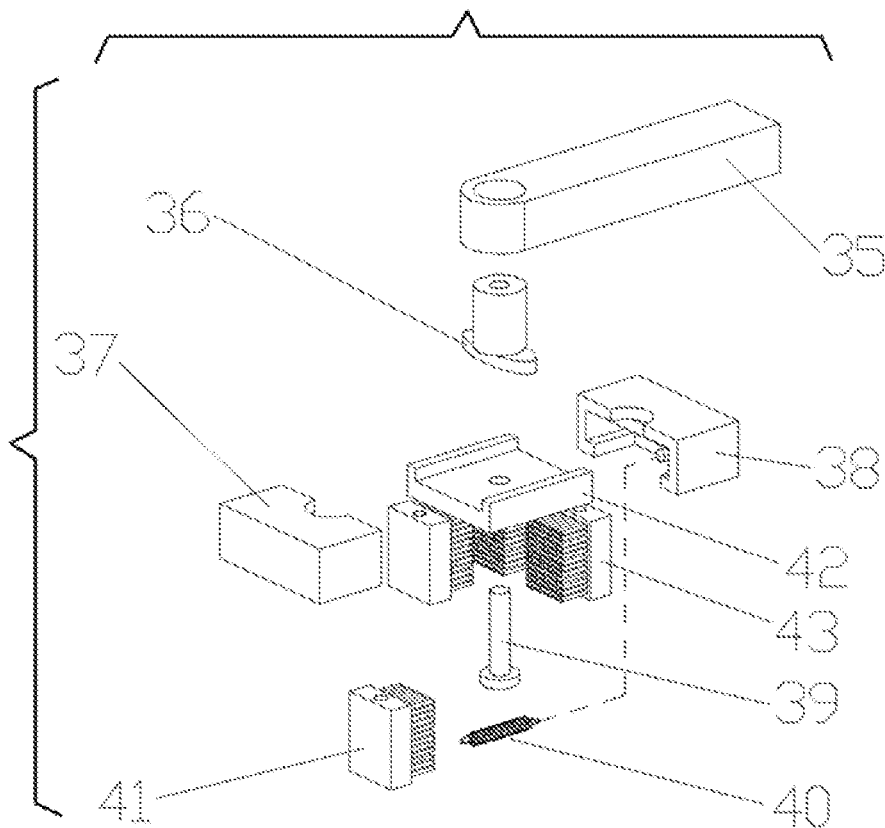
FIG. 7 is an exploded view of a partial structure of the electric toothbrush of Example 3.
Figure 8:
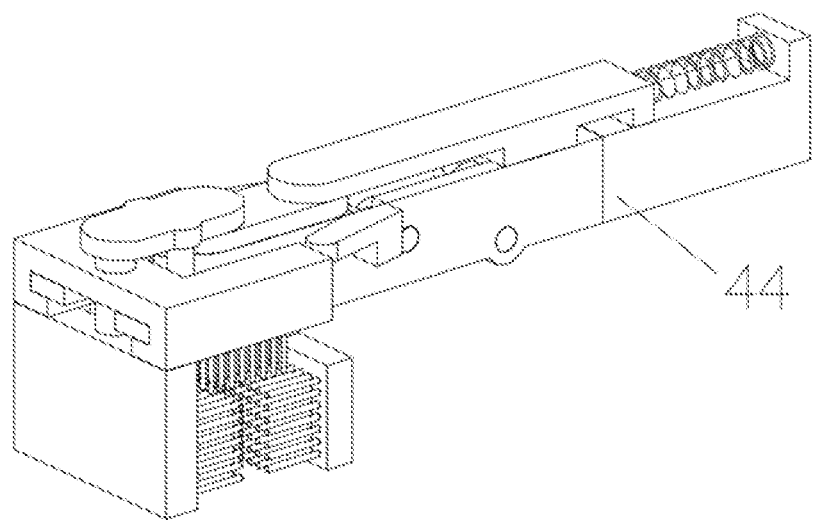
FIG. 8 is a partial structural schematic diagram of an electric toothbrush of Example 4.
Figure 9:
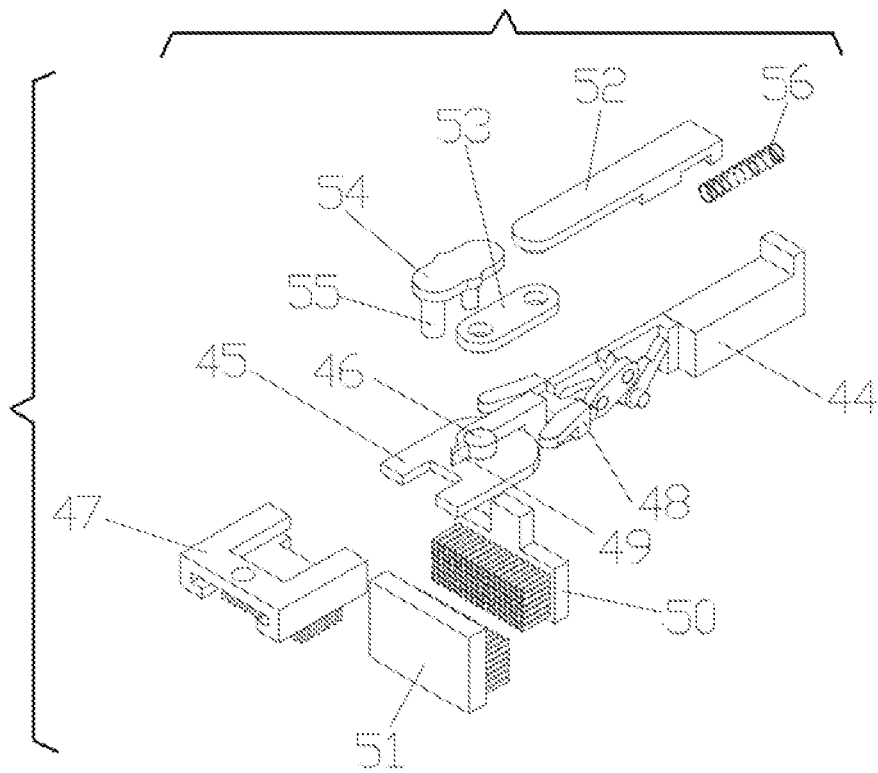
FIG. 9 is an exploded view of a partial structure of the electric toothbrush of Example 4.
Figure 10:
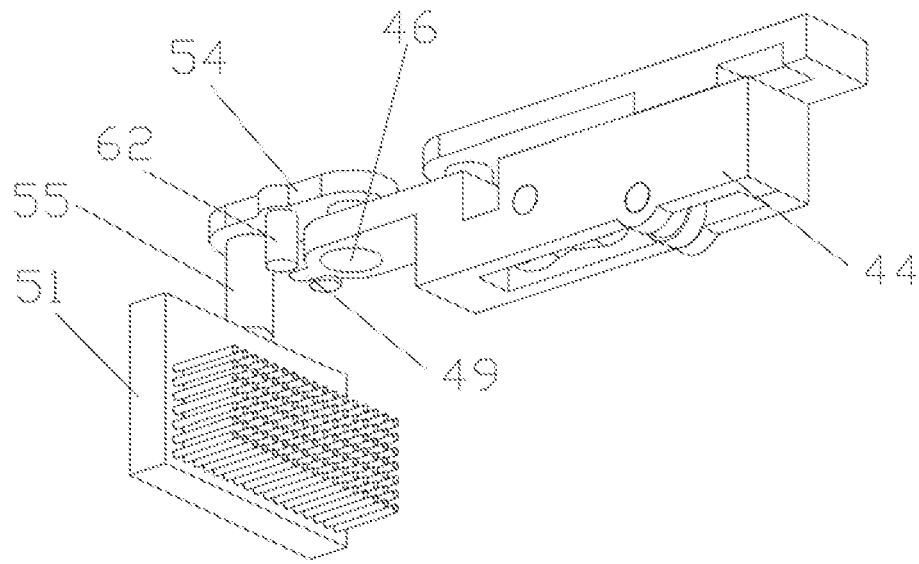
FIG. 10 is a top view of a partial structure of the electric toothbrush of Example 4.
Figure 11:
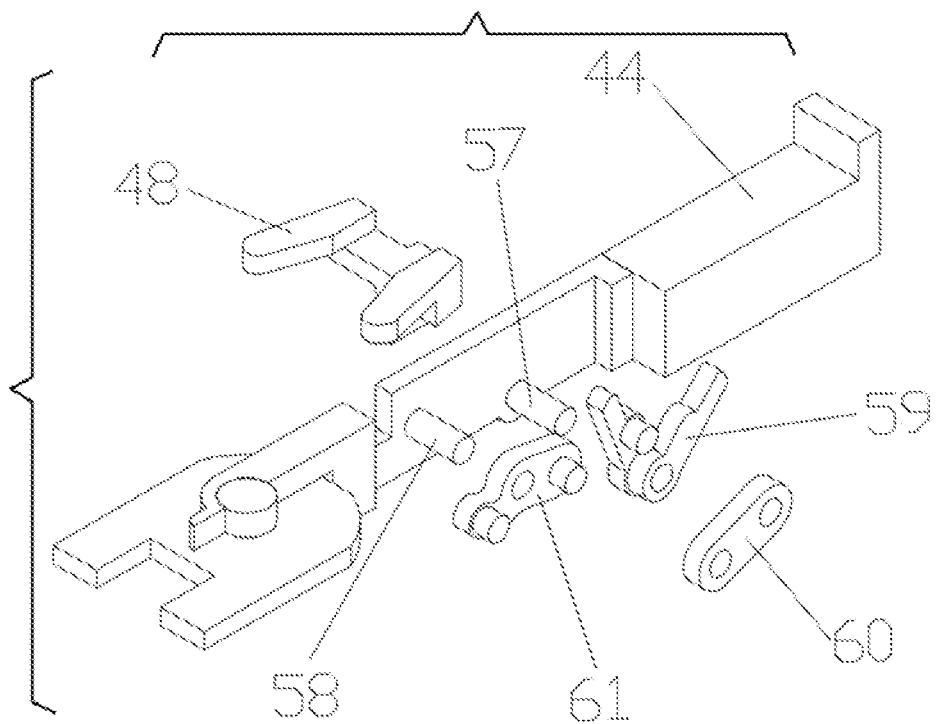
FIG. 11 is an exploded view of the electric toothbrush of the electric toothbrush of Example 4.

As shown in the FIG. 6 and FIG. 7, an electric toothbrush comprising three-sided brush bristles comprises a toothbrush body; the toothbrush body comprises a toothbrush head; the toothbrush head comprises a handle part 35; the front portion of the handle part comprises a mounting hole; a fixed nail 39 is disposed through the mounting hole; the first platy body is disposed below the handle part; the fixed nail is taken as the first rotating shaft; the first platy body 42 is disposed below the handle part, and the middle portion of the first platy body comprises a first through hole for receiving the first rotating shaft; the first platy body comprises a first sliding piece 37 and a second sliding piece 38 disposed oppositely to each other; the front portion of the handle part is provided with the cam 36 for pushing the first sliding piece and the second sliding piece, and a spring 40 is disposed between the first sliding piece and the second sliding piece; a lower portion of the first sliding piece is provided with the first brushing sheet 41 and a lower portion of the second sliding piece is provided with the second brushing sheet 43; the lower surface of the first platy body is provided with the brush bristle; the rear side surface of the first brushing sheet is provided with the brush bristle, and the front side surface of the second brushing sheet is provided with the brush bristle. Owing to the surrounding effect of the three-sided brush bristles and adapting to the thickness change from the frontal teeth to the molar teeth, a self-adaptive effect that the brush bristles automatically attach to the teeth can achieve the purpose of effectively cleaning the teeth of people with different sizes of oral cavities and teeth. The design of the three-sided brush bristles solves the cleaning problem of the blind area on the inner side of the tooth and avoids the development of various bad tooth brushing habits. A user no longer needs to change the position of the toothbrush to search for a cleaning point and only needs to push the toothbrush head to complete the whole tooth brushing process, such that the tooth brushing process is simplified and the tooth brushing efficiency is improved.

A cross section of the cam is elliptical. Thus, the first sliding piece and the second sliding piece are pushed conveniently at the same time.

The electric toothbrush comprises two first brushing sheets, and the two first brushing sheets are respectively disposed on two side portions of the first sliding piece; and the electric toothbrush also comprises two second brushing sheets, and the two second brushing sheets are respectively disposed on two side portions of the second sliding piece. The first brushing sheets are connected to the first sliding piece via the second rotating shaft and the second brushing sheets are connected to the second sliding piece via the third rotating shaft. The four brushing sheets are rotatable, and different curved surfaces of teeth are laminated according to the design of the split brush bristles effectively, such that teeth gaps are cleaned efficiently.

To improve the cleaning effect, the brush bristles disposed on the lower surface of the first platy body are disposed vertically, the brush bristles disposed on the rear side surface of the first brushing sheet are disposed obliquely and the brush bristles disposed on the front side surface of the second brushing sheet are disposed obliquely.

Both the first sliding piece and the second sliding piece are bulky bodies; the middle of each of the bulky bodies is provided with a groove for placing the first platy body; the cam is disposed above the first platy body, and the spring is disposed below the first platy body. Two side portions on the first platy body are provided with strip-type protrusions, and both the first sliding piece and the second sliding piece are provided with strip-type grooves matched with the strip-type protrusions. The using effect of the device is ensured, such that the first sliding piece and the second sliding piece are prevented from sliding laterally.

The rear side surface of the first brushing sheet comprises a first embedding groove; a first tooth contact piece is disposed in the first embedding groove; the first tooth contact piece comprises a first protrusion, and an outer side surface of the first protrusion is cambered; and a front side surface of the second brushing sheet comprises a second embedding groove; a second tooth contact piece is disposed in the second embedding groove; the second tooth contact piece comprises a second protrusion, and an outer side surface of the second protrusion is cambered. Both the first tooth contact piece and the second tooth contact piece are strip-type body. There are two first protrusions and the two first protrusions are disposed on two side portions of the first tooth contact piece; and there are two second protrusions and the two second protrusions are disposed on two side portions of the second tooth contact piece. The first tooth contact piece and the second tooth contact piece in contact with teeth with different thicknesses can push the first brushing sheet and the second brushing sheet to expand towards two sides along with thickness change of the teeth so as to be self-adaptive to the thickness change from the front tooth to the molar tooth. The two first protrusions and two second protrusion fit the surfaces of the teeth during use, such that the brushing sheets fit the surfaces of the teeth better after rotation, and thus, the contact area between the brush bristles and the surfaces of the teeth is larger, and the cleaning effect is improved.

When the teeth are brushed, the front surface of the toothbrush is placed in the oval cavity, the user pushes the handle part along a tooth-brushing direction, the handle part rotates, and the cam disposed on the front side of the handle part pushes and distracts the first sliding piece and the second sliding piece to fit the corner of the tooth; the first tooth contact piece and the second tooth contact piece mounted on the first brushing sheet and the second brushing sheet are in contact with the teeth with different thicknesses so as to further push the first brushing sheet and the second brushing sheet to deflect and expand towards two sides along with thickness change to be self-adaptive to the thickness change from the front tooth to the molar tooth, and then the brush bristle is frapped by the spring to fit the tooth. Further, by matching and exerting the parts, a self-adaptive effect of expanding the toothbrush head, clinging the toothbrush head to the teeth and transforming the angle freely is achieved.

Example 4

As shown in FIG. 8 to FIG. 11, an electric toothbrush with the three-sided brush bristles comprises a toothbrush body; the toothbrush body comprises a toothbrush head; the toothbrush head comprises a handle part 44; the first platy body 47 is disposed below the handle part, and a first brushing sheet 51 and a second brushing sheet 50 disposed oppositely to each other are disposed below the first platy body; a lower surface of the first platy body is provided with a brush bristle; a rear side surface of the first brushing sheet is provided with a brush bristle and a front side surface of the second brushing sheet is provided with a brush bristle; the second platy body 45 is disposed below the handle part, the second platy body comprises a first cylindrical protrusion 46, and the front portion of the handle part is provided with the first groove for receiving the first cylindrical protrusion; the two second brushing sheets are disposed below the rear portion of the second platy body; the middle portion of the first platy body comprises a sliding groove for receiving the second platy body, and the front portion of the handle part comprises a pushing piece 48 for pushing the sliding piece to move forward; the first platy body is taken as the sliding piece; the toothbrush head comprises a reset mechanism which comprises a pull rod 52; the pull rod is disposed above the handle part; the back portion of the handle part comprises a first protrusion; a spring 56 is fixed to the back portion of the pull rod; one end of the spring is fixed to the pull rod, and the other end of the spring is fixed to the first protrusion; the front portion of the pull rod comprises a second cylindrical protrusion; the front side of the pull rod comprises a first connecting sheet 53; a back portion of the first connecting sheet comprises a first through hole for receiving the second cylindrical protrusion; the front side of the first connecting sheet is provided with a rotating sheet 54; an upper end portion of the first cylindrical protrusion is fixed to the back portion of the rotating piece; a middle portion of the rotating sheet is provided with two third cylindrical protrusions 62 disposed in parallel; the front portion of the handle part comprises a second protrusion 49, and the second protrusion is disposed between two third cylindrical protrusions; the front portion of the rotating sheet is provided with a connecting rod 55; the front portion of the sliding piece is provided with the third through hole; the connecting rod penetrates through the third through hole, and the first brushing sheet is fixed to the lower portion of the connecting rod. Owing to the surrounding effect of the three-sided brush bristles and adapting to the thickness change from the frontal teeth to the molar teeth, a self-adaptive effect that the brush bristles automatically attach to the teeth can achieve the purpose of effectively cleaning the teeth of people with different sizes of oral cavities and teeth. The design of the three-sided brush bristles solves the cleaning problem of the blind area on the inner side of the tooth and avoids the development of various bad tooth brushing habits. A user no longer needs to change the position of the toothbrush to search for a cleaning point and only needs to push the toothbrush head to complete the whole tooth brushing process, such that the tooth brushing process is simplified and the tooth brushing efficiency is improved.

The front portion of the handle part comprises a second groove; a side wall of the second groove is provided with a fourth cylindrical protrusion 57 and a fifth cylindrical protrusion 58; a first connecting rod 59 is fixed to the fourth cylindrical protrusion; a cross section of the first connecting rod is V-shaped, and the middle portion of the first connecting rod is provided with a third through hole for receiving the fourth cylindrical protrusion; the lower portion of the pull rod is provided with a third protrusion for pushing and pulling the first connecting rod, and the third protrusion is disposed above the third through hole; the front side of the first connecting rod is provided with a second connecting sheet 60; the first connecting rod is provided with a sixth cylindrical protrusion; the back portion of the second connecting sheet is provided with a fourth through hole for receiving the sixth cylindrical protrusion; the front side of the second connecting sheet is provided with the second connecting rod 61; the back portion of the second connecting rod is provided with a seventh cylindrical protrusion, and the front portion of the second connecting sheet is provided with a fifth through hole for receiving the seventh cylindrical protrusion; the middle portion of the second connecting rod is provided with a fourth through hole for receiving the sixth cylindrical protrusion, and the front portion of the second connecting rod is disposed below the pushing piece; the front portion of the handle part is provided with a mounting groove; a middle portion of the pushing piece is disposed in the mounting groove, and a depth of the mounting groove is greater than a thickness of the middle portion of the pushing piece. By means of the design, when the handle part rotates, the pushing piece and the sliding pieces are in contact or non-contact. When the handle part starts to rotate, the pushing piece and the sliding pieces are in a contact state, the pushing piece pushes the sliding pieces to move forwards; the sliding pieces drive the second brushing sheet to move forward so as to further drive the first brushing sheet and the second brushing sheet to expand towards two sides along with thickness change to be self-adaptive to the thickness change from the front tooth to the molar tooth; when the handle part rotates to a certain extent, a third protrusion on the lower portion of the pull rod pushes the first connecting rod; the first connecting rod drives the second connecting rod to move via the second connecting sheet so as to lift the upper portion of the second connecting rod upwards and push the pushing piece upwards, such that the pushing piece and the sliding piece are in a non-contact condition, and under the non-contact condition, the sliding piece and the handle part are in contact; the handle part rotates to push the sliding pieces, and the toothbrush head is not limited in rotating angle as the pushing piece is in contact with the sliding pieces, such that the rotatable angle of the toothbrush head is improved and it is convenient for the user to brush teeth.

The cross section of the front portion of the second protrusion is elliptical. The pushing piece is a bulky body; two side portions of the bulky body are provided with fourth protrusion bended outwards, and the cross section of the front portion of the fourth protrusion is elliptical. It is convenient for the second protrusion to push the sliding pieces to deflect smoother and for the pushing piece to push the sliding piece to move forward smoother.

To improve the cleaning effect, the brush bristles d on the lower surface of the sliding piece are disposed vertically; the brush bristles on the front side surface of the first brushing sheet are disposed obliquely, and the brush bristles on the rear side surface of the second brushing sheet are disposed obliquely.

When the toothbrush is used, the front surface of the toothbrush is placed in the oval cavity; the user pushes the handle part along a tooth-brushing direction; the handle part rotates about the first cylindrical protrusion, and the second protrusion disposed on the front side of the handle part is in contact with two third cylindrical protrusions below the rotating piece to push the rotating sheet to deflect in angle, such that the rotating sheet drives the first brushing sheet below to deflect via the connecting rod, and thus, a gap between the first brushing sheet and the second brushing sheet is distracted to fit the corner of the tooth; and meanwhile, the pushing piece disposed on the front side of the handle part pushes the sliding pieces to move forwards, and the sliding pieces drive the first brushing sheet to move forwards to further drive the first brushing sheet and the second brushing sheet to expand towards two sides along with thickness change to be self-adaptive to the thickness change from the front tooth to the molar tooth, and then the brush bristle is frapped by the spring to fit the tooth. After use of the toothbrush, the toothbrush head is restored. Further, by matching and exerting the parts, a self-adaptive effect of expanding the toothbrush head, clinging the toothbrush head to the teeth and transforming the angle freely is achieved.

Owing to the surrounding effect of the three-sided brush bristles and adapting to the thickness change from the frontal teeth to the molar teeth, a self-adaptive effect that the brush bristles automatically attach to the teeth can achieve the purpose of effectively cleaning the teeth of people with different sizes of oral cavities and teeth. The design of the three-sided brush bristles solves the cleaning problem of the blind area on the inner side of the tooth and avoids the development of various bad tooth brushing habits. A user no longer needs to change the position of the toothbrush to search for a cleaning point and only needs to push the toothbrush head to complete the whole tooth brushing process, such that the tooth brushing process is simplified and the tooth brushing efficiency is improved.

It will be obvious to those skilled in the art that changes and modifications may be made, and therefore, the aim in the appended claims is to cover all such changes and modifications.

The invention claimed is:

1. An electric toothbrush comprising three-sided brush bristles, the electric toothbrush comprising a toothbrush body; the toothbrush body comprising a toothbrush head; the toothbrush head comprising a handle part, a first platy body disposed below the handle part, and a first brushing sheet and a second brushing sheet disposed side by side and below the first platy body; wherein:

the first platy body comprises a lower surface provided with a first brush bristle; the first brushing sheet comprises a rear side surface provided with a second brush bristle, and the second brushing sheet comprises a front side surface provided with a third brush bristle;

the handle part comprises a first through hole and a first pressing nail disposed through the first through hole; with the first pressing nail as a first rotating shaft, the first platy body comprises a first mounting hole for receiving the first rotating shaft;

a second platy body is disposed below the first platy body, and a lower surface of the second platy body is provided with a fourth brush bristle;

a front side of the first platy body is provided with a sliding plate; a back portion of the sliding plate extends into a space between the first platy body and the second platy body, and two side portions of the first platy body are provided with sliding grooves, respectively; a back portion of the sliding plate is provided with two sliding blocks matched with the sliding grooves, respectively; an upper portion of each of the sliding blocks extends out from upper sides of the sliding grooves; two bulky bodies are disposed above the first platy body, and each of the two bulky bodies comprises a first embedding groove for receiving the upper portion of each sliding block; a stop dog for pushing the two bulky bodies is disposed below the handle part, and the stop dog is disposed on a rear side of the first through hole;

a lining plate is disposed below the sliding plate; the lining plate comprises a second mounting hole, and a connecting rod is disposed through the second mounting hole; a brushing sheet bracket is disposed below the lining plate; with the connecting rod as a second rotating shaft, the brushing sheet bracket comprises a third mounting hole for receiving the second rotating shaft, and the first brushing sheet is disposed below the brushing sheet bracket;

a steering member is disposed above the sliding plate; the steering member comprises a first insert hole for receiving an upper portion of the connecting rod; a back portion of the steering member is provided with a groove, and a side portion of the handle part close to the groove is provided with a protrusion for pushing the steering member to deflect;

the second platy body comprises a fourth mounting hole, and a second pressing nail is disposed through the fourth mounting hole; a second brushing sheet is disposed below the second platy body; with the second pressing nail as a third rotating shaft, the second brushing sheet comprises a fifth mounting hole for receiving the third rotating shaft; and a connecting column is disposed between the first platy body and the second platy body, and a middle portion of the sliding plate is provided with a mounting groove; a spring is disposed in the mounting groove, and one end of the spring is fixed to the sliding plate and the other end of the spring is fixed to the connecting column.

2. The electric toothbrush of claim 1, wherein
the lining plate comprises two second mounting holes, and the two second mounting holes are respectively disposed in two side portions of the lining plate; and the second platy body comprises two fourth mounting holes, and the two fourth mounting holes are respectively disposed in two side portions of the second platy body.

3. The electric toothbrush of claim 1, wherein the first brush bristle on the lower surface of the first platy body are disposed vertically; the second brush bristle on the rear side surface of the first brushing sheet is disposed obliquely; and the third brush bristle on the front side surface of the second brushing sheet is disposed obliquely.

4. An electric toothbrush comprising three-sided brush bristles, the electric toothbrush comprising a toothbrush body; the toothbrush body comprising a toothbrush head; the toothbrush head comprising a handle part, a first platy body disposed below the handle part, and a first brushing sheet and a second brushing sheet disposed side by side and below the first platy body; wherein:

the first platy body comprises a lower surface provided with a first brush bristle; the first brushing sheet comprises a rear side surface provided with a second brush bristle, and the second brushing sheet comprises a front side surface provided with a third brush bristle;

the first platy body comprises a first cylindrical protrusion; a front portion of the handle part comprises a driving wheel; with the first cylindrical protrusion as a first rotating shaft, a middle portion of the driving wheel comprises a first through hole for receiving the first rotating shaft;

the first platy body is provided with two driven wheels disposed in parallel; the driven wheels are in engaged connection to the driving wheel; a front side of the first platy body is provided with a sliding plate; a steering member is disposed above the sliding plate, and a cam for pushing the steering member to deflect is disposed below the driven wheel;

a second platy body is disposed below the first platy body; a back portion of the sliding plate extends into a space between the first platy body and the second platy body; a connecting column is disposed between the first platy body and the second platy body; a middle portion of the sliding plate is provided with a mounting groove; a spring is disposed in the mounting groove; one end of the spring is fixed to the sliding plate and the other end of the spring is fixed to the connecting column;

a lining plate is disposed below the sliding plate; the lining plate comprises a second cylindrical protrusion, and a first brushing sheet bracket is disposed below the lining plate; with the second cylindrical protrusion as a second rotating shaft, the first brushing sheet bracket comprises a second through hole for receiving the second rotating shaft, and the first brushing sheet is disposed below the first brushing sheet bracket; and a back portion of the second platy body comprises a third cylindrical protrusion; a second brushing sheet bracket is disposed below the second platy body; with the third cylindrical protrusion as a third rotating shaft, the second brushing sheet bracket comprises a third through hole for receiving the third rotating shaft, and the second brushing sheet is disposed below the second brushing sheet bracket.

5. The electric toothbrush of claim 4, wherein:
the electric toothbrush comprises two first brushing sheet brackets, and the two first brushing sheet brackets are respectively disposed on two side portions of the lining plate; and the electric toothbrush comprises two second brushing sheet brackets, and the two second brushing sheet brackets are respectively disposed on two side portions of the second platy body.

6. The electric toothbrush of claim 4, wherein
a rear side surface of the first brushing sheet comprises a first embedding groove, and a first tooth contact piece is disposed in the first embedding groove; the first tooth contact piece comprises a first protrusion, and an outer side surface of the first protrusion is cambered; and
a front side surface of the second brushing sheet comprises a second embedding groove, and a second tooth contact piece is disposed in the second embedding groove; the second tooth contact piece comprises a second protrusion, and an outer side surface of the second protrusion is cambered.

7. An electric toothbrush comprising three-sided brush bristles, the electric toothbrush comprising a toothbrush body; the toothbrush body comprising a toothbrush head; the toothbrush head comprising a handle part, a first platy body disposed below the handle part, and a first brushing sheet and a second brushing sheet disposed side by side and below the first platy body; wherein:
the first platy body comprises a lower surface provided with a first brush bristle; the first brushing sheet comprises a rear side surface provided with a second brush bristle, and the second brushing sheet comprises a front side surface provided with a third brush bristle;
a front portion of the handle part comprises a mounting hole; a fixed nail is disposed through the mounting hole; the first platy body is disposed below the handle part; with the fixed nail as a first rotating shaft, a middle portion of the first platy body comprises a first through hole for receiving the first rotating shaft;
the first platy body comprises a first sliding piece and a second sliding piece disposed oppositely to each other; the front portion of the handle part is provided with a cam for pushing the first sliding piece and the second sliding piece, and a spring is disposed between the first sliding piece and the second sliding piece; and
a lower portion of the first sliding piece is provided with the first brushing sheet and a lower portion of the second sliding piece is provided with the second brushing sheet.

8. An electric toothbrush comprising three-sided brush bristles, the electric toothbrush comprising a toothbrush body; the toothbrush body comprising a toothbrush head; the toothbrush head comprising a handle part, a first platy body disposed below the handle part, and a first brushing sheet and a second brushing sheet disposed side by side and below the first platy body; wherein:
the first platy body comprises a lower surface provided with a first brush bristle; the first brushing sheet comprises a rear side surface provided with a second brush bristle, and the second brushing sheet comprises a front side surface provided with a third brush bristle;
a second platy body is disposed below the handle part; the second platy body comprises a first cylindrical protrusion, and a front portion of the handle part is provided with a first groove for receiving the first cylindrical protrusion;
the second brushing sheet is disposed below a rear portion of the second platy body;
a middle portion of the first platy body comprises a sliding groove for receiving the second platy body; with the first platy body as a sliding piece, the front portion of the handle part comprises a pushing piece for pushing the sliding piece to move forward;
the toothbrush head comprises a reset mechanism which comprises a pull rod; the pull rod is disposed above the handle part; a back portion of the handle part comprises a first protrusion, and a spring is fixed to the back portion of the pull rod; one end of the spring is fixed to the pull rod, and the other end of the spring is fixed to the first protrusion;
a front portion of the pull rod comprises a second cylindrical protrusion; a front side of the pull rod comprises a first connecting sheet; a back portion of the first connecting sheet comprises a first through hole for receiving the second cylindrical protrusion; a front side of the first connecting sheet is provided with a rotating sheet; an upper end portion of the first cylindrical protrusion is fixed to a back portion of the rotating piece, and a middle portion of the rotating sheet is provided with two third cylindrical protrusions disposed in parallel; the front portion of the handle part comprises a second protrusion, and the second protrusion is disposed between the two third cylindrical protrusions; and
a front portion of the rotating sheet is provided with a connecting rod; a front portion of the sliding piece is provided with a second through hole; the connecting rod penetrates through the second through hole, and the first brushing sheet is fixed to a lower portion of the connecting rod.

9. The electric toothbrush of claim 8, wherein
the front portion of the handle part comprises a second groove; a side wall of the second groove is provided with a fourth cylindrical protrusion and a fifth cylindrical protrusion; a first connecting rod is fixed to the fourth cylindrical protrusion, and a cross section of the first connecting rod is V-shaped; a middle portion of the first connecting rod is provided with a third through hole for receiving the fourth cylindrical protrusion;
a lower portion of the pull rod is provided with a third protrusion for pushing and pulling the first connecting rod, and the third protrusion is disposed above the third through hole;
a front side of the first connecting rod is provided with a second connecting sheet; the first connecting rod is provided with a sixth cylindrical protrusion; a back portion of the second connecting sheet is provided with a fourth through hole for receiving the sixth cylindrical protrusion; a front side of the second connecting sheet is provided with a second connecting rod; a back portion of the second connecting rod is provided with a seventh cylindrical protrusion, and a front portion of the second connecting sheet is provided with a fifth through hole for receiving the seventh cylindrical protrusion;
a middle portion of the second connecting rod is provided with a fourth through hole for receiving the sixth cylindrical protrusion, and the front portion of the second connecting rod is disposed below the pushing piece; and
the front portion of the handle part is provided with a mounting groove; a middle portion of the pushing piece is disposed in the mounting groove, and a depth of the mounting groove is greater than a thickness of the middle portion of the pushing piece.

* * * * *